US 6,305,118 B1

(12) United States Patent
Wacha

(10) Patent No.: US 6,305,118 B1
(45) Date of Patent: Oct. 23, 2001

(54) METAL LIP JIG RIG THREADER DEVICE

(76) Inventor: Willard C. Wacha, 46 Delaware St., Walton, NY (US) 13856

( * ) Notice: Subject to any disclaimer, the term of this patent is extended or adjusted under 35 U.S.C. 154(b) by 0 days.

(21) Appl. No.: 09/855,680

(22) Filed: May 16, 2001

Related U.S. Application Data

(60) Provisional application No. 60/233,662, filed on Sep. 19, 2000.

(51) Int. Cl.[7] ................................................ A01K 97/00
(52) U.S. Cl. ............................................. 43/4; 43/42.53
(58) Field of Search ........................ 43/1, 4, 53.5, 42.53

(56) References Cited

U.S. PATENT DOCUMENTS

| Re. 24,902 | * | 12/1960 | Dillard | 43/53.5 |
| 2,718,082 | * | 9/1955 | Limacher | 43/53.5 |
| 2,859,994 | * | 11/1958 | Whitlinger | 43/1 |
| 2,880,545 | * | 4/1959 | Stadler | 43/4 |
| 2,948,979 | * | 8/1960 | Kulp | 43/4 |
| 3,050,896 | * | 8/1962 | Parker | 43/4 |
| 3,164,067 | * | 1/1965 | Hurst | 43/4 |
| 3,165,858 | * | 1/1965 | Rutter | 43/42.53 |
| 3,419,924 | * | 1/1969 | Archibald | 43/53.5 |
| 4,118,881 | | 10/1978 | McFarlane | 43/4 |
| 4,566,213 | * | 1/1986 | Cossin | 43/1 |
| 4,674,220 | | 6/1987 | Bearce, Jr. et al. | 43/4 |
| 4,706,403 | | 11/1987 | Reynolds | 43/4 |
| 4,848,019 | | 7/1989 | Toogood | 43/4 |
| 4,915,631 | | 4/1990 | Robinson et al. | 43/4 |
| 5,125,180 | | 6/1992 | Dean | 43/4 |
| 5,155,930 | | 10/1992 | Monarez | 43/4 |
| 5,307,586 | * | 5/1994 | Palmer | 43/53.5 |
| 5,367,814 | | 11/1994 | Peterson | 43/4 |
| 5,735,071 | | 4/1998 | Gouldie et al. | 43/4 |
| 5,934,009 | * | 8/1999 | Trahan | 43/53.5 |
| 6,041,540 | | 3/2000 | Potts | 43/42.24 |
| 6,205,698 | * | 3/2001 | Richards | 43/53.5 |

FOREIGN PATENT DOCUMENTS

WO/97/09875    3/1997    (WO) .

* cited by examiner

Primary Examiner—Darren W. Ark
(74) Attorney, Agent, or Firm—Richard C. Litman

(57) ABSTRACT

A metal lip jig threader device for rigging a flexible plastic bait, frozen bait, cut fresh bait, and live bait having a metal lip with one hook on a leader line in one fluid step. Additional dressing such as feathers, fur or hair can be added to the lure. An improved method is shown for making a metallic lipped live or artificial fish lure with at least one hook. An improved metal lip jig is shown having a hook secured by a rivet and spurs.

3 Claims, 5 Drawing Sheets

METAL LIP JIG RIG THREADER DEVICE

CROSS-REFERENCE TO RELATED APPLICATION

This application claims the benefit of U.S. Provisional Patent Application Serial No. 60/233,662, filed Sep. 19, 2000.

BACKGROUND OF THE INVENTION

1. Field of the Invention

The present invention relates generally to fishing jig lures. More specifically, the invention is a new device and an improved method for making a metallic lipped plastic fish lure with at least one hook rigged by a hand held device. A metal lip jig is disclosed for attaching various baits.

2. Description of Related Art

The related art of interest is a crowded art, but none discloses the present invention. There is a need for a hand device for a fisherman which can rig a plastic lure with a metal lip and at least one hook while on location. Additionally, as a subcombination, a metal lip jig, per se, for attaching bait is disclosed.

The related art will be discussed in the order of perceived relevance to the present invention.

U.S. Pat. No. 5,157,859 issued on Oct. 27, 1992, to Clarence L. Wirkus describes a cast lead fishing jig comprising an upturned hook portion with a long shank imbedded in an oval shaped body of cast lead having a convex upper surface and a concave lower surface. The eye portion of the hook is bent at a right angle to protrude up from the body proximate its nose. A worm, leech or a plastic wriggler can be attached to the upturned hook portion. The jig is distinguishable for requiring an environmentally dangerous lead body made by casting around a bent hook.

U.S. Pat. No. 6,041,540 issued on Mar. 28, 2000, to Carl J. Potts describes an artificial soft plastic fishing lure comprising three threaded fish strung on one line to simulate a school of bait fish. A fish has artificial eyes, a V-shaped dorsal fin, a dorsal rattle or fish-attracting scent in an elongated dorsal void space, and a ventral Y-shaped fiber weed guard. The artificial fishing lure is distinguishable for its requirement for various adornments.

W.I.P.O. Pat. Application No. WO/97/09875 published on Mar. 20, 1997, for Allen R. McDonald et al. describes a lead sinker coated with either rubber, plastic or latex and impregnated with fish oils. The lead sinker is distinguishable for being directed to only the lead sinker.

The following remaining references are all directed to the threading of a worm on a hook by various devices. The patents are distinguishable for being limited to worms or fish without metal lips.

U.S. Pat. No. 4,674,220 issued on Jun. 23, 1987, to Ronald H. Bearce, Jr. et al. describes a pocketable worm threading device comprising a cylindrical barrel member containing an extendable hollow brass needle and a clipped cap. A live worm is threaded on the extended needle. A hook on a leader line is placed at the tip of the extended needle and the worm is threaded onto the leader line. The cap is used to remove a hook from a fish and to aid in tying a hook to a line. The device is distinguishable for being limited to threading worms onto a leader line and hook.

U.S. Pat. No. 4,706,403 issued on Nov. 17, 1987, to John L. Reynolds describes a fishing bait threader tool having a bored handle with three slots to accommodate a hollow needle at one end and a solid needle with a radial arm having a crook portion, a return portion and a forward extending prong. The tool is distinguishable for its two needle and handle structures.

U.S. Pat. No. 4,118,881 issued on Oct. 8, 1978, to Douglas A. McFarlane describes a method and apparatus for threading worms on fishhooks comprising a rectangular block with various grooves and a hole for inserting part of the worm, threading the worm with a tubing in a groove, and placing the worm upright on the block. A hook is placed on the tip of the tubing and threaded with the worm. The device is distinguishable for its structural differences.

U.S. Pat. No. 4,848,019 issued on Jul. 18, 1989, to Paul Toogood describes an automatic worm threader comprising an upright hand gripping member with a right-angled extending member and another upright worm impaler having a concave end for accommodating the hook. The device is distinguishable for its unique structure.

U.S. Pat. No. 5,125,180 issued on Jun. 30, 1992, to Gordon G. Dean describes a fishhook worm baiting tool comprising an elongated L-shaped solid rod with a blind bore for attaching the hook and a wingnut at the opposite end for securing the leader line in a taut manner for threading the worm onto the line and hook. The device is distinguishable for its different structure.

U.S. Pat. No. 4,915,631 issued on Apr. 10, 1990, to Oscar T. Robinson et al. describes a fishing worm threader device comprising a handle with a projecting fishing line support with a slit and a hollow tube for threading the worm. The device is distinguishable for its structure.

U.S. Pat. No. 5,155,930 issued on Oct. 20, 1992, to Faustino Monarez describes a worm threading device comprising a hollow handle for storing a live worm and having an arm member at a right angle with a notch for holding the leader line while threading the worm onto the hook placed in the tip of the hollow shank on the handle. The device is distinguishable for its arm member and the storage capacity in the handle.

U.S. Pat. No. 5,367,814 issued on Nov. 29, 1994, to Steven H. Petersen describes an apparatus for baiting a fishing line with a worm comprising a cylindrical rod having a throughbore and a tube extending to a sharp edge for threading a live worm. A fishing line is threaded from the reel through the tube, the impaled worm and the handle to be wound around the handle. The line is unwound from the device and tied to a hook after the impaled worm is detached from the apparatus. The apparatus and method of baiting are distinguishable for the requirement of threading the line through the tube and alongside the tube for impaling the worm and removing most of the line.

U.S. Pat. No. 5,735,071 issued on Apr. 7, 1998, to David J. Gouldie et al. describes a fishing accessory for threading a worm on a hook and sharpening the hook barb comprising a penlike assembly with the main body being hollow and storing the piercing assembly having a threaded base. The cap has a sharpening stone and a pocket clip. The worm is threaded with the hook and line in the usual manner. The fishing accessory is distinguishable for its storage handle structure.

None of the above inventions and patents, taken either singly or in combination, is seen to describe the instant invention as claimed.

SUMMARY OF THE INVENTION

The present invention is directed to a new device and an improved method of manually making a metal lipped plastic fish lure with at least one hook on a leader line rigged by a novel hand held device. The hand tool has a telescopic antenna element with an open end and located next to a rod element with a right angle bend for holding the metal lip which can have a hook attached to it. A wooden handle is hollowed out for insertion of a sharp pointed spike based in a cork. The distal end of the handle can have a throughbore for insertion of a cord loop. The method of making a hooked and metal lipped lure comprises piercing a plastic lure, e.g., a minnow, with the spike. The prepared leader line has at least one hook on its end or two hooks in tandem. The pierced plastic minnow is placed on the telescopic antenna element with a small portion of the end exposed for insertion of the barbed tip of at least one hook. The opposite end of the leader line has the metal lip conventionally provided with a punched out holder strap and optionally a hook. The fisherman places the metal lip by its holder strap on the extending right angled rod. It is preferred that the length of leader line from the first hook to the second hook is taut by extending the telescopic antenna. Then the process of moving the plastic lure up the leader line to the metal lip is performed. The rigged lure can now be released from the tool by collapsing the telescopic rod. A subcombination is a metal lip jig lure, per se, on which either soft plastic bait, frozen cut bait, live bait can be hooked or dressed further with feathers, fur or animal hair.

Accordingly, it is a principal object of the invention to provide a hand tool that can form a fish lure by adding at least one hook and a metal lip attached to a leader and threading a plastic fish lure.

It is another object of the invention to provide a method of producing a flexible plastic lure with a metal lip and hooks by utilizing a novel hand tool.

It is a further object of the invention to provide a combination hand tool with a telescopic antenna for holding a lure and a terminal hook, and a separate metal lip holder.

Still another object of the invention is to provide a combination tool having a spike in its handle for piercing a plastic lure in preparation for making the hooked and metal lipped lure.

Yet another object of the invention is to provide a subcombination of a metal lip jig lure, per se, on which either soft plastic bait, frozen cut bait, live bait can be hooked or dressed further with feathers, fur or animal hair.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1A:
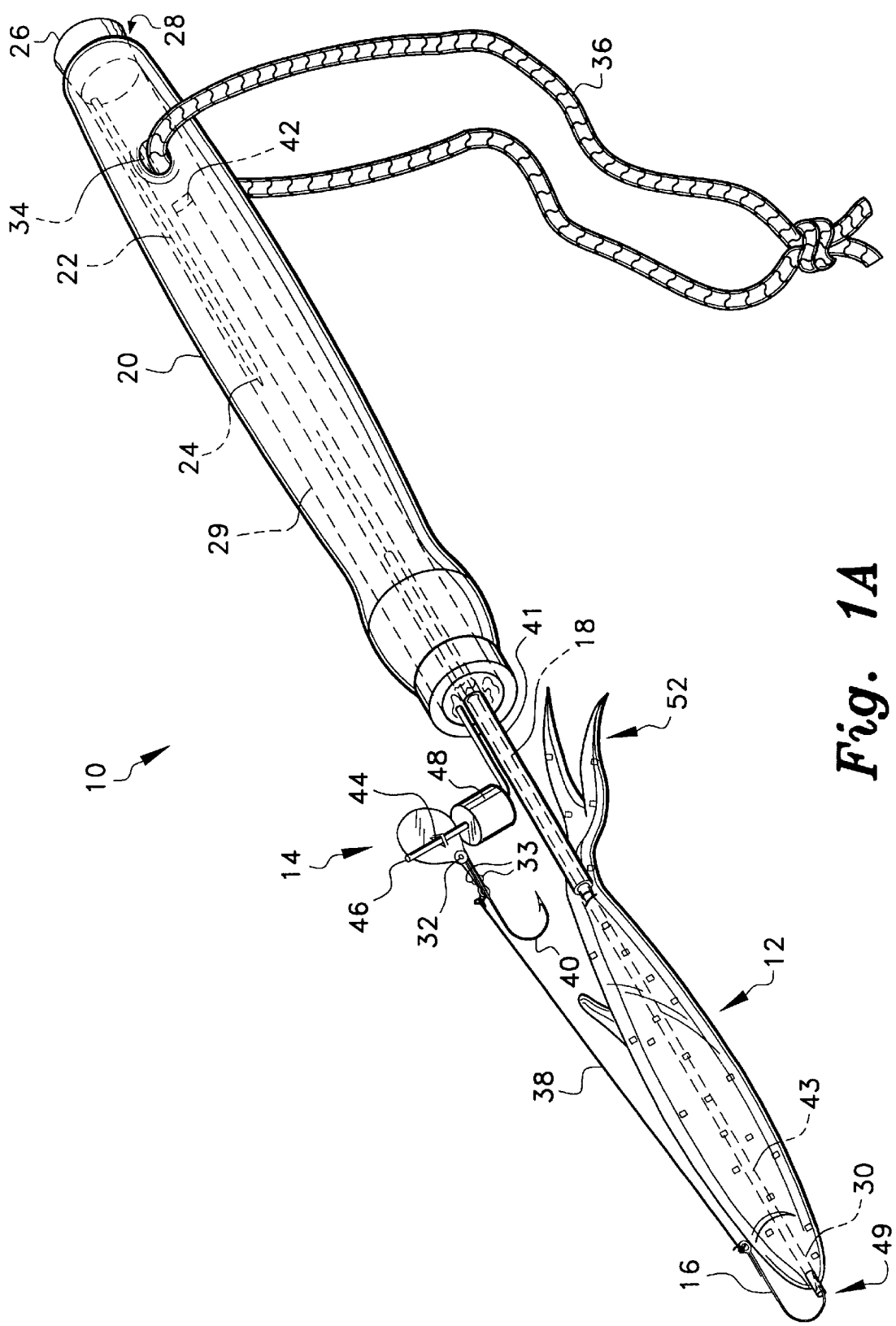
FIG. 1A is an environmental, perspective view of a metal lip jig rig threader tool according to the present invention with the telescoping rod in an extended position being used to thread bait on a metal lip jig rig.
Figure 1B:
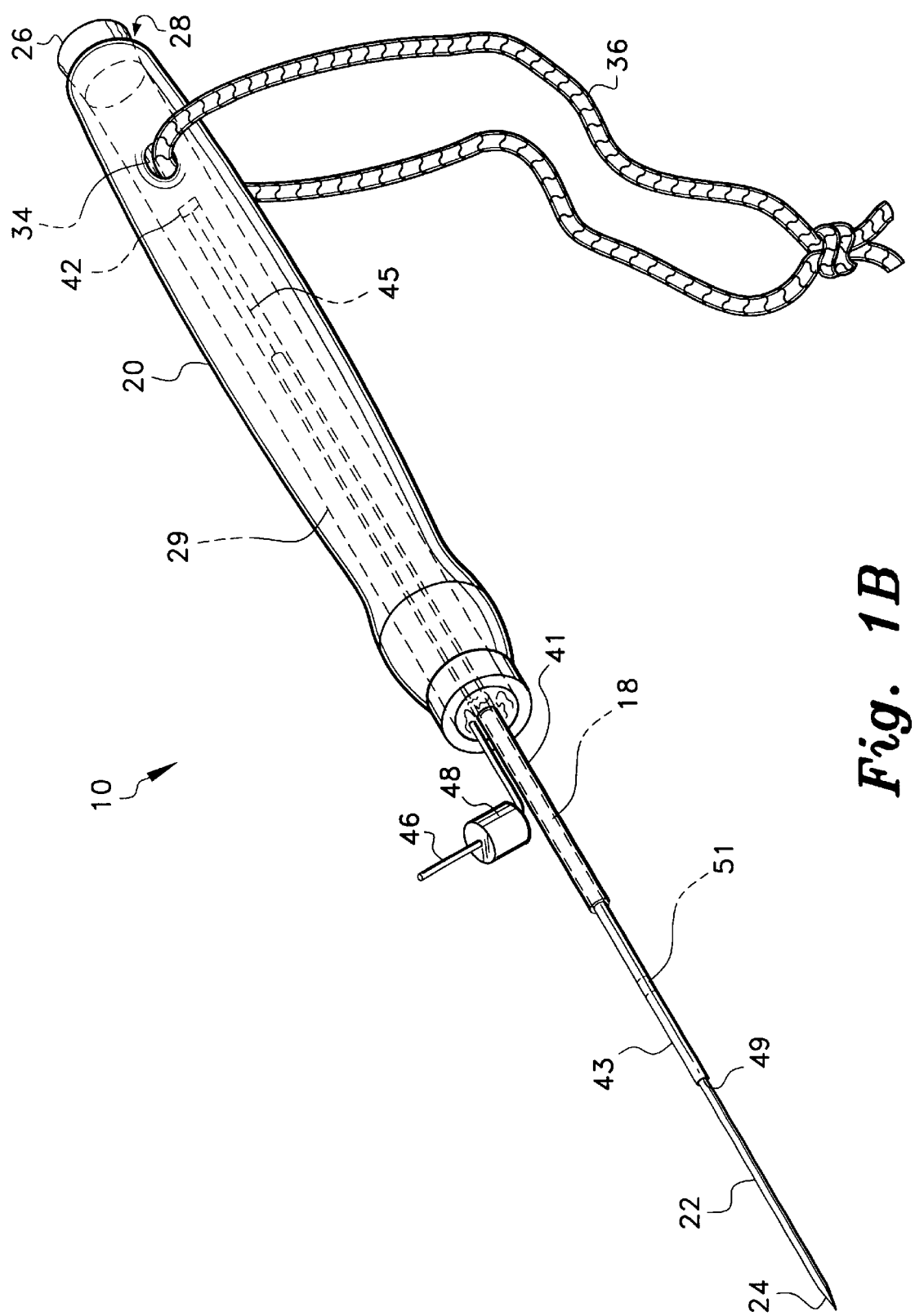
FIG. 1B is a perspective view of the metal lip jig rig threader tool according to the present invention with the telescoping rod in a retracted position.

In one aspect, shown in FIGS. 1A and 1B, the present invention is directed to a hand tool 10 for rigging a plastic fish lure 12 with a metal lip jig 14 and at least one hook 16. The tool 10 comprises a telescopic antenna-like hollow rod 18 attached to a hollow wooden handle 20. The tool 10 has a spike 22 (in dashed lines) with a sharp point 24 which is stored in a bore 29 defined in hollow handle 20 when not in use, a cork plug 26 being used to retain the spike 22 in the handle 20. The cork plug 26 can be frictionally seated at the end 28 of the handle 20. The spike 22 may be removed from the handle 20 and mounted in the hollow end of the telescoping rod 18, as shown in FIG. 1B, for forming a longitudinal throughbore 30 in the plastic minnow lure 12. The handle 20 also has another throughbore 34 proximate the distal end 28 extending transversely through the handle 20, through which a loop of cord 36 is attached. The cord loop 36 can be hung from a fisherman's belt.

The leader line 38 has been pre-rigged with a terminal hook 16 and attacked to a metal lip jig 14. A second hook 40 is attached to the pre-fashioned metal lip jig 14 by a rivet 32 and spurs 33 and has a punched out strap 44. A right-angled rod 46 positioned adjacent the telescopic rod 18 has a rubber collar 48 for conveniently abutting the metal lip 14 or for wrapping line in a slot in the rubber collar 48.

A first outer brass tubing 41 having a closed end 42 fits axially in the hollow wooden handle 20 and extends out from the end of the handle 20 opposite the cork 26. A second inner brass tubing 43 fits slidingly inside the first outer tubing 41 with a wire 45 extending from its bottom end which rests on the closed end 42 of the first outer tubing 41 when the inner tubing 43 is in a retracted position, so that the top end of the tubing does not slide down into the outer tubing 41, but remains at least one inch above the end of the outer tubing 41. When the spike 22 is inserted in the open end 49 of inner tubing 43, a plug 51, e.g. a glue plug, approximately an inch from the open end 49 prevents the spike 22 from going further into the second tubing 43, leaving about two inches of the spike 22 extending from the open end 49 of inner tubing 43.

Figure 2:
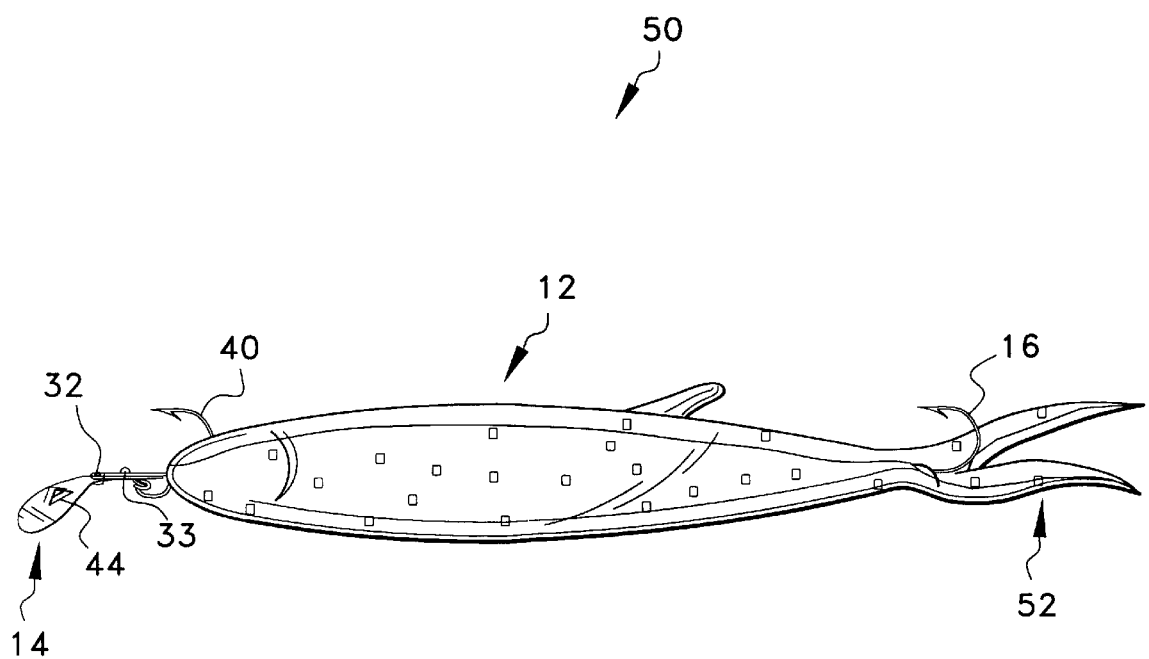
FIG. 2 is side elevation view of a plastic minnow threaded with two hooks by the jig rigging tool of the present invention.

In FIG. 2, the completed lure 50 is depicted with the hooks 16 and 40 separated by a hidden leader line 38 formed by the following process.

The process of forming the rigged lure 50 begins with removing the spike 22 from the handle 20 and inserting the spike 22 into the open end 49 of inner tubing 43, the telescoping rod 18 being in a retracted position, as shown in FIG. 1B. A lure or item of bait, such as a plastic minnow 12, is inserted longitudinally over the telescoping rod 18, tail end 52 first, the pointed end 24 of the spike 22 piercing the minnow and defining a longitudinal bore 30 in the minnow 12. The minnow 12 is threaded down over the telescoping rod 18, and the spike 22 is removed from the rod 18, leaving a small length of the inner tubing 43 exposed. The barb of the terminal hook 16 is now placed in the open end 49 of the telescopic rod 18. The metal lip jig rig 14 is attached to the right-angled rod 46 by its punched out strap 44. The telescoping rod 18 is moved to the extended position shown in FIG. 1A to stretch the leader line 38 tight. The plastic lure 12 is now pushed up over hook 16 and down the leader line 38. The head of the minnow 12 is attached to the second hook 40 by sliding the lure over the neck 58 of the metal lip jig rig 14 and piercing the minnow 12 with the barb of second hook 40, and the base of the tail is attached to the first hook 16 to form the finished product, i.e., the rigged lure 50. The telescoping rod 18 is retracted, hook 16 is removed from inner tubing 43, and metal lip jig 14 is removed from rod 46. This rigging procedure can be performed with the inventive tool by the fisherman while fishing. Thus, an efficient and quick method of rigging a plastic lure with a metal lip and hooks has been shown.

The advantages of this method of rigging a plastic lure with a metal lip are that the weighted lure can be cast, trolled or jigged on the bottom. The hooks are arranged with the barbs up to minimize any snagging problems. Any plastic lure can be used, such as fish, crayfish, worms, shrimp, frogs, lizards, hellgrammites, tube tails, grubs, and the like. Even lipped bucktail lures can be made. Spinners can be attached at the rivet or the metal lip end. The metal lips can be colored. Live and frozen bait such as salmon eggs, crayfish, hellgrammites, leeches, night crawlers, and nymphs can be incorporated to make these jig lures. Fur, feathers and animal hair can be added as dressing for use with a fly or spinner rod.

One outstanding advantage of this tool 10 is the addition of bait lure to the fish lure 12 by adding a liquid bait lure composition to either the spike 22 or the end of the telescopic rod 18 before moving the lure onto the leader line 38.

Figure 3:
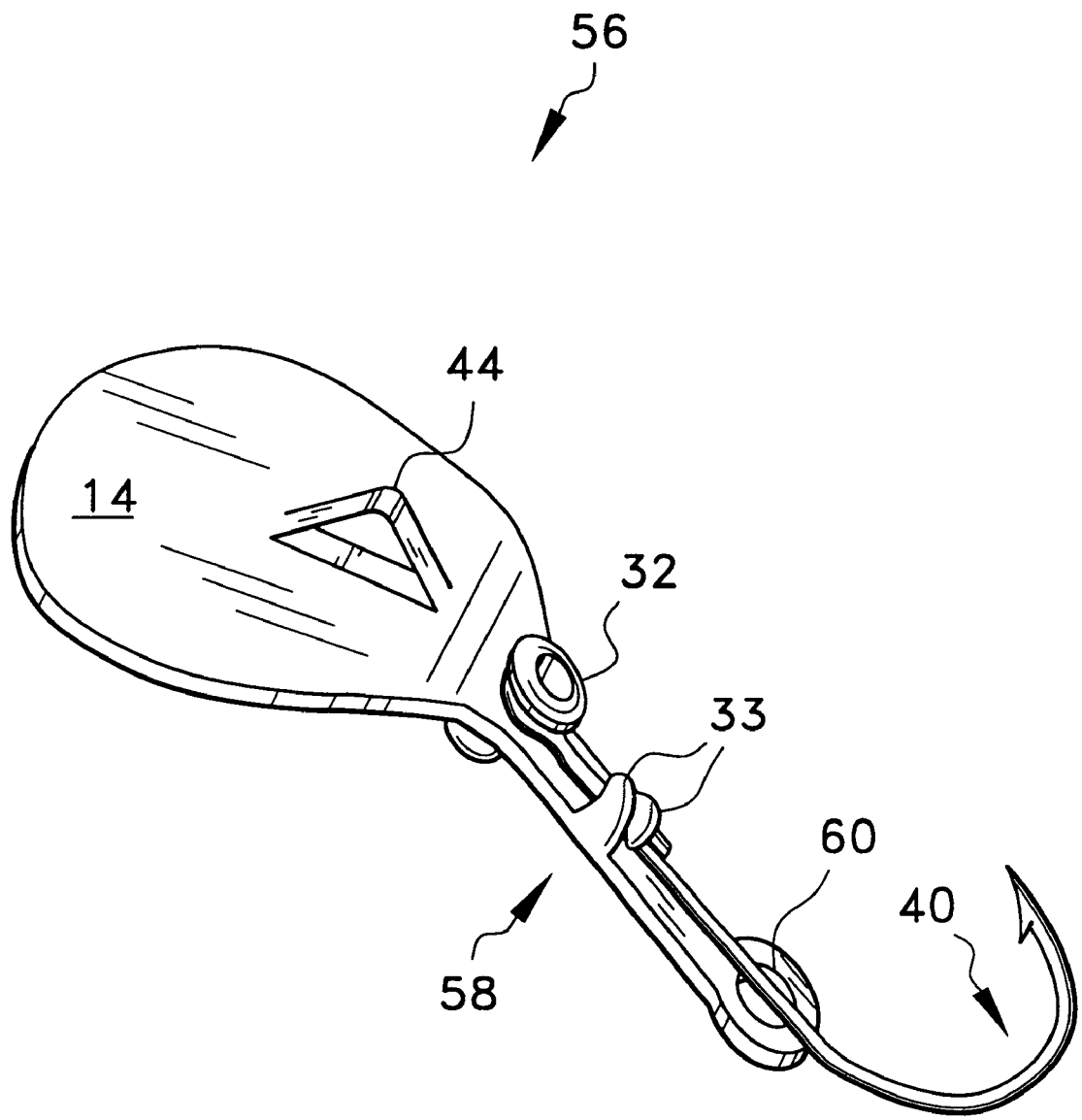
FIG. 3 is an enlarged perspective view of a metal lip jig rig according to the present invention.
Figure 4:
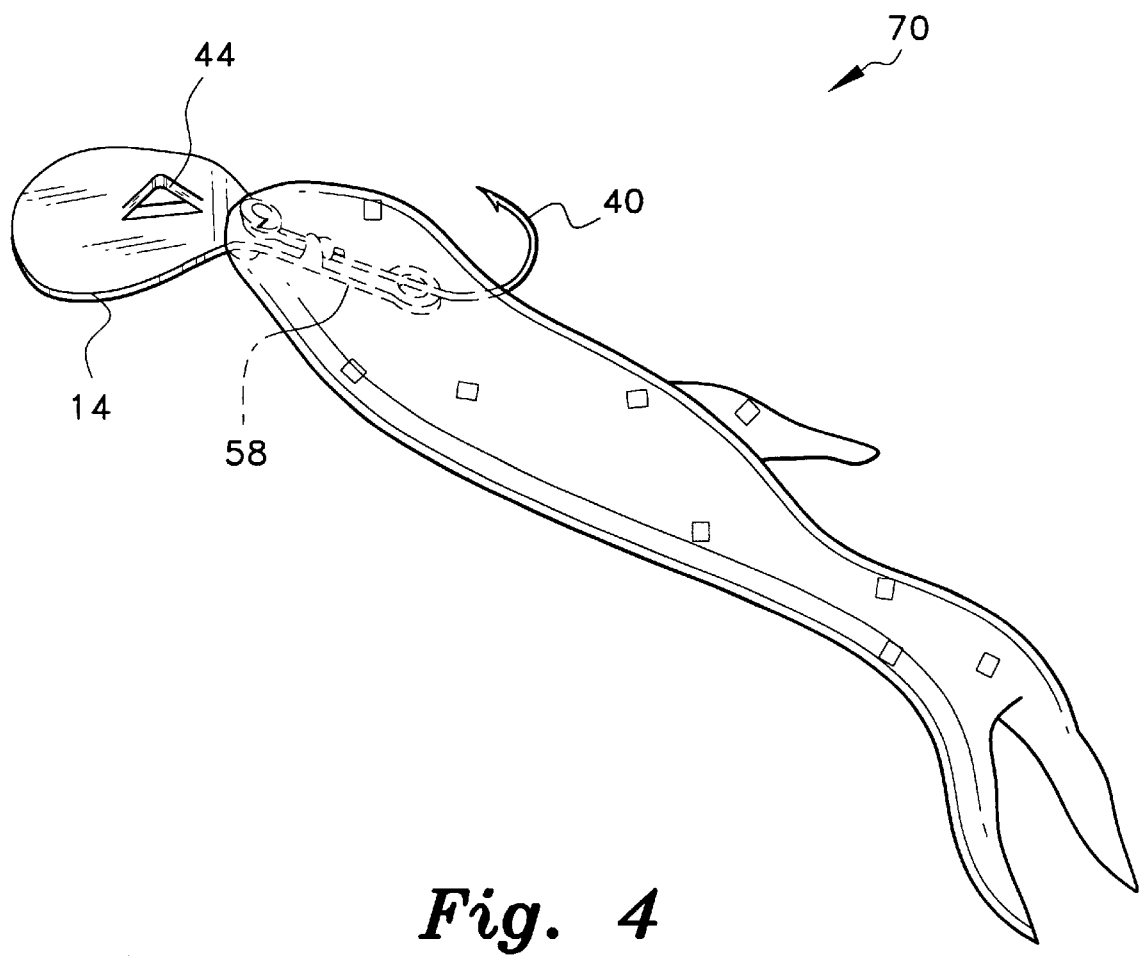
FIG. 4 shows and elevation view of a lure having the metal lip jig rig of the present invention and a single hook.

In FIG. 3, a metal lipped jig 56 according to the present invention is shown enlarged having a bulbous metal lip portion 14, such as a metal lip made from brass coated with nickel, with one strap 44, which is punched out of the lip or otherwise attached to the lip 14, for attachment to the fishing line, as well as attachment to rod 46 of tool 10. An elongated neck portion 58 has a rivet 32 and spurs 33 for fastening second hook 40 securely to the lip portion 14. A terminal eyelet 60 is conveniently provided on the neck portion 58 for attachment of another trailing hook, if desired, or for tying leader line 38 to metal lip jig 14. Bait such as soft plastic lures, frozen bait, and live bait can be hooked to form a lure approximately 4 inches long. The jig 56 can be approximately 1¼ inches long, 9/16 inch wide lip 14, and ⅛ inch thick. The metal lip portion 14 can be conveniently bent at various angles to control the depth of the lure. Advantageously, the metal lip jig rig 14 eliminates the necessity of using lead weights or sinkers.

The versatility of a single metal lip jig rig device is evident when one rig device can be readily converted into numerous other lures by adding any one of bait lures such as soft plastic, frozen, live, cut, and tied on flies and streamers. The lures can also be used with various fishing rods such as spinning, fly and bait rods. A foot long trailer line having a hook can be attached to the terminal hook 16 for adding salmon eggs, a fly, etc. because the metal lip acts as a sinker without requiring lead weights.

It should be especially noted that the present invention is an ergonomic and environmentally safe alternative to the use of lead jigs being used.

It is to be understood that the present invention is not limited to the sole embodiment described above, but encompasses any and all embodiments within the scope of the following claims.

I claim:

1. A hand tool for forming a metallic lipped fish jig lure, comprising:

a telescopic hollow rod having an open front end and a closed rear end;

a hollow handle having a first end and a second end, the rear end of said rod being attached to the first end of the handle, the handle having a bore extending longitudinally therein defining an opening at the second end of the handle;

a removable stopper engaging the opening at the second end of the handle;

a jig mounting rod having a right angle bend, the jig mounting rod being attached to the handle adjacent to the telescopic rod;

wherein a lure is slidable over the telescoping rod while telescoping rod is in a retracted position, the lure being slidable over a hook and a leader line to a metal lip jig rig mounted on the jig mounting rod when the telescoping rod is in an extended position.

2. The hand tool according to claim 1, wherein said telescoping rod comprises:

an outer tubing attached to said handle; and an inner tubing slidably disposed in said outer tubing, the inner tubing having an open top end and having a plug defined below the open top end.

3. The hand tool according to claim 2, further comprising a spike for piercing a plastic lure, the spike being slidably disposed in the open top end of said inner tubing when in use, and being storable in the bore defined in said hollow handle when not in use.

* * * * *